United States Patent
Kim et al.

(10) Patent No.: US 10,595,004 B2
(45) Date of Patent: Mar. 17, 2020

(54) ELECTRONIC DEVICE FOR GENERATING 360-DEGREE THREE-DIMENSIONAL IMAGE AND METHOD THEREFOR

(71) Applicant: SAMSUNG ELECTRONICS CO., LTD., Suwon-si (KR)

(72) Inventors: Do-wan Kim, Suwon-si (KR); Sung-jin Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 15/751,086

(22) PCT Filed: Jul. 28, 2016

(86) PCT No.: PCT/KR2016/008256
§ 371 (c)(1),
(2) Date: Feb. 7, 2018

(87) PCT Pub. No.: WO2017/026705
PCT Pub. Date: Feb. 16, 2017

(65) Prior Publication Data
US 2018/0278916 A1   Sep. 27, 2018

Related U.S. Application Data

(60) Provisional application No. 62/202,420, filed on Aug. 7, 2015.

(30) Foreign Application Priority Data

Apr. 5, 2016   (KR) .................. 10-2016-0041538

(51) Int. Cl.
H04N 5/225 (2006.01)
H04N 5/247 (2006.01)
(Continued)

(52) U.S. Cl.
CPC ........... *H04N 13/243* (2018.05); *G02B 13/06* (2013.01); *G03B 37/04* (2013.01); *G06T 5/50* (2013.01);
(Continued)

(58) Field of Classification Search
CPC ....... G06T 7/55; G06T 7/593; G06T 2200/04; G06T 2207/20221; G06T 7/50;
(Continued)

(56) References Cited

U.S. PATENT DOCUMENTS 5,923,331 A * 7/1999 Dusseux ................. G06T 15/40
345/421
7,176,960 B1   2/2007 Nayar et al.
(Continued)

FOREIGN PATENT DOCUMENTS

CN   101290467 A   10/2008
CN   102692806 A   9/2012
(Continued)

OTHER PUBLICATIONS

Tong et al. "Spherical Camera Model for Divergent Camera Cluster" 2012 IEEE, 6 pages. (Year: 2012).*
(Continued)

*Primary Examiner* — Nathnael Aynalem
(74) *Attorney, Agent, or Firm* — Sughrue Mion, PLLC

(57) ABSTRACT

The present disclosure relates to an electronic device for capturing a plurality of images using a plurality of cameras, generating a left-eye-view spherical image and a right-eye-view spherical image by classifying each of the plurality of images as a left-eye-view image or a right-eye-view image, obtaining depth information using the generated left-eye-view spherical image and right-eye-view spherical image, and generating a 360 degree three-dimensional image, wherein the three-dimensional effect thereof is controlled
(Continued)

using the obtained depth information, and an image processing method therefor.

16 Claims, 18 Drawing Sheets
(2 of 18 Drawing Sheet(s) Filed in Color)

(51) Int. Cl.
G03B 37/04 (2006.01)
H04N 13/00 (2018.01)
H04N 13/243 (2018.01)
H04N 5/232 (2006.01)
H04N 13/271 (2018.01)
G02B 13/06 (2006.01)
H04N 5/222 (2006.01)
G06T 7/593 (2017.01)
G06T 5/50 (2006.01)

(52) U.S. Cl.
CPC ............ *G06T 7/596* (2017.01); *H04N 5/2226* (2013.01); *H04N 5/2258* (2013.01); *H04N 5/23238* (2013.01); *H04N 5/247* (2013.01); *H04N 13/271* (2018.05); *H04N 2013/0081* (2013.01); *H04N 2213/001* (2013.01)

(58) Field of Classification Search
CPC .. G06T 7/596; H04N 13/243; H04N 5/23238; H04N 13/10; H04N 13/302; H04N 2013/0081; H04N 13/271; H04N 2213/001; H04N 5/2226; H04N 5/2258; H04N 5/247; G03B 37/04; G02B 13/06
USPC ....... 382/154; 359/7, 376, 462, 466; 348/36, 348/42, 47, 51
See application file for complete search history.

(56) References Cited

U.S. PATENT DOCUMENTS

| 7,336,299 | B2 | 2/2008 | Kostrzewski et al. |
| 7,460,985 | B2* | 12/2008 | Benitez .............. G02B 27/0012 703/2 |
| 9,706,118 | B2 | 7/2017 | Chapdelaine-Couture et al. |
| 10,104,286 | B1* | 10/2018 | Yu .............................. G06K 9/46 |
| 2002/0181802 | A1* | 12/2002 | Peterson ................. G06T 3/005 382/284 |
| 2003/0234909 | A1* | 12/2003 | Collender .............. G03B 25/00 353/7 |
| 2004/0169617 | A1* | 9/2004 | Yelton ..................... G06T 15/04 345/1.1 |
| 2007/0097206 | A1 | 5/2007 | Houvener et al. |
| 2007/0124783 | A1* | 5/2007 | Ahiska ............... H04N 5/23206 725/105 |
| 2011/0050857 | A1 | 3/2011 | Lee et al. |
| 2012/0154519 | A1 | 6/2012 | Zargarpour et al. |
| 2013/0100132 | A1* | 4/2013 | Katayama ........... H04N 13/275 345/420 |
| 2013/0141423 | A1* | 6/2013 | Cho ................... G02B 27/2264 345/419 |
| 2013/0141547 | A1* | 6/2013 | Shimizu ................ G06T 3/0062 348/48 |
| 2014/0098186 | A1* | 4/2014 | Seidl ....................... G06T 15/10 348/36 |
| 2014/0104378 | A1 | 4/2014 | Kauff et al. |
| 2014/0205185 | A1 | 7/2014 | Tokui et al. |
| 2014/0362176 | A1 | 12/2014 | St. Clair et al. |
| 2015/0249815 | A1* | 9/2015 | Sandrew ............... G06T 15/205 348/47 |

FOREIGN PATENT DOCUMENTS

| CN | 104079918 A | 10/2014 |
| JP | 2006-54662 A | 2/2006 |
| JP | 2010-171914 A | 8/2010 |
| JP | 2010-181826 A | 8/2010 |
| JP | 2013-78101 A | 4/2013 |
| KR | 10-0922250 B1 | 10/2009 |
| KR | 10-0957590 B1 | 5/2010 |
| KR | 10-2011-0025020 A | 3/2011 |
| KR | 10-2014-0118083 A | 10/2014 |
| KR | 10-2015-0122670 A | 11/2015 |

OTHER PUBLICATIONS

Kim, et al., "Novel 360 degrees stereoscopic panoramas by using 4 Fish-eye lens cameras for VR Application", 2015, Global 3D Tech Forum 2015 Digest, two (2) pages total.
Kim, et al., "360 Degrees Stereoscopic Panorama Reconstruction by Using 4 Fisheye Lens cameras for VR/AR applications", Samsung Best Paper Award 2015, Graphics Lab, MST, DMC R&D center, pp. 1-6.
Search Report dated Nov. 29, 2016, issued by the International Searching Authority in counterpart International Patent Application No. PCT/KR2016/008256 (PCT/ISA/210).
Written Opinion dated Nov. 29, 2016, issued by the International Searching Authority in counterpart International Patent Application No. PCT/KR2016/008256 (PCT/ISA/237).
Communication dated Jul. 2, 2018, issued by the European Patent Office in counterpart European Patent Application No. 16835345.6.
Communication dated Dec. 27, 2018, issued by the State Intellectual Property Office of P.R. China in counterpart Chinese Application No. 201680046576.9.
Communication dated Oct. 8, 2019, issued by the State Intellectual Property Office of P.R. China in counterpart Chinese Application No. 201680046576.9.

* cited by examiner

FIG. 5
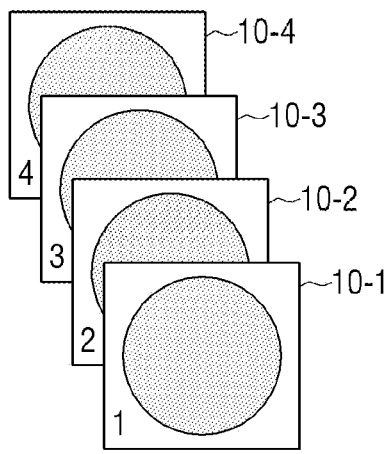
4 circular fisheye images
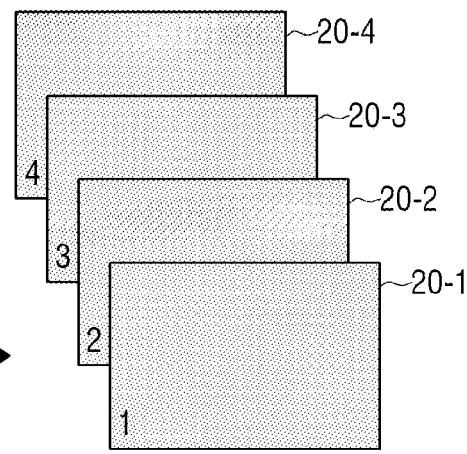
Equirectangular
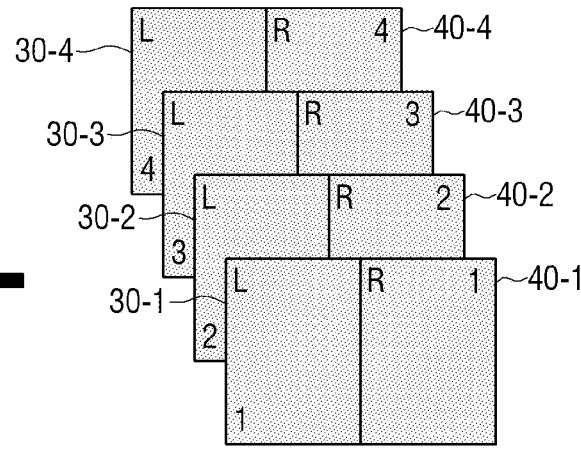
8 half Equirectangular
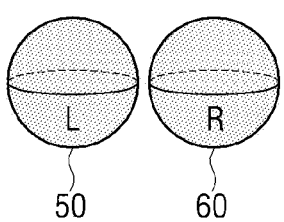
unit sphere

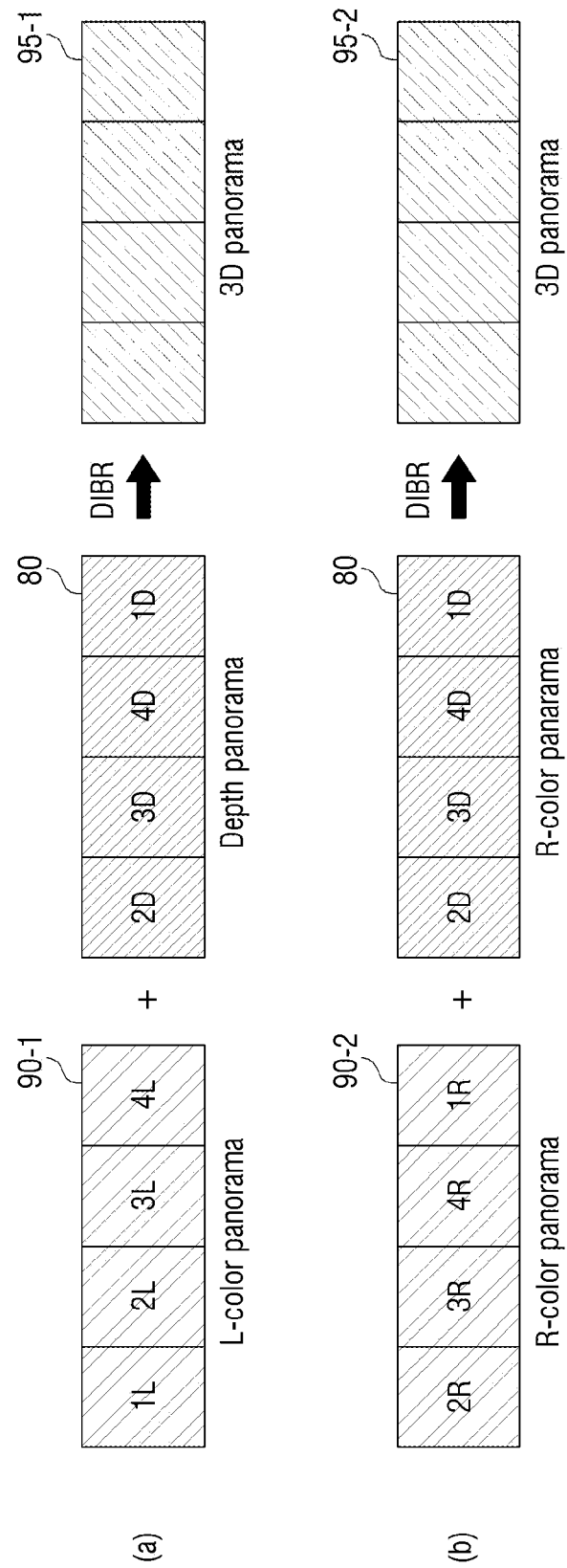

(a) 1010　(b) 1020

FIG. 11
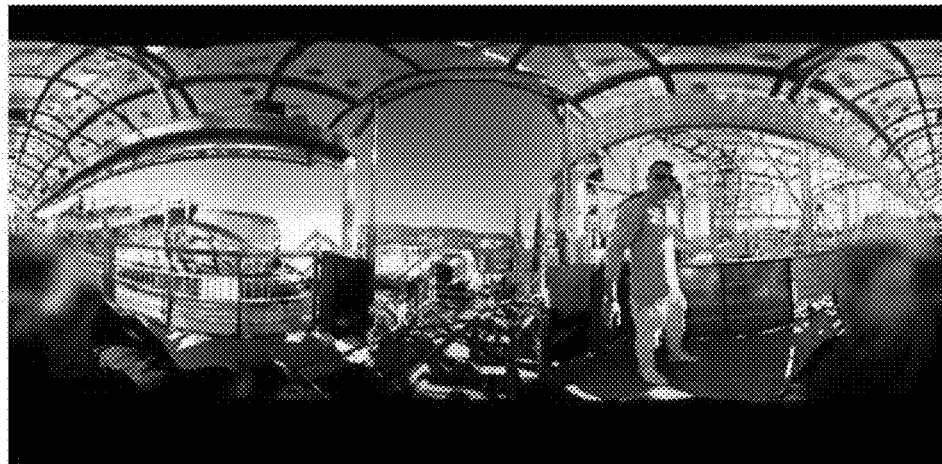
(a)
(b)
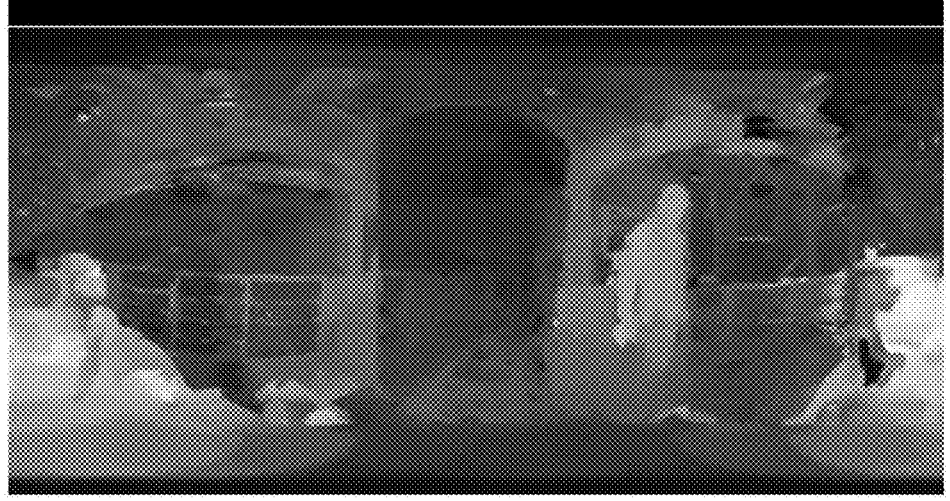
(c)

ELECTRONIC DEVICE FOR GENERATING 360-DEGREE THREE-DIMENSIONAL IMAGE AND METHOD THEREFOR

TECHNICAL FIELD

The present disclosure relates to an electronic device for generating a 360-degree three dimensional (3D) stereoscopic image and an image processing method thereof. More specifically, the present disclosure relates to an electronic device for generating a 360-degree 3D stereoscopic image by extracting depths from a plurality of images imaged using a plurality of cameras and an image processing method thereof.

BACKGROUND ART

In recent years, technologies related to virtual reality fields have been attracting attention. In particular, small wearable device technologies capable of experiencing virtual reality such as head-mounted displays have been developed. However, virtual reality content is lacking as compared with technologies of device capable of providing the virtual reality content. Accordingly, there is an increasing need for a technology for generating the virtual reality content applicable to the small wearable device technologies.

In the related art, a large number of cameras are necessary to generate a small 3D virtual reality content. To solve this problem, a 360-degree 3D stereoscopic image is generated using a plurality of wide-angle lenses such as fisheye lenses in the related art.

However, there is a problem that in response to the 360-degree 3D stereoscopic image being generated using a plurality of wide-angle lenses such as fisheye lenses, image distortion occurs in a depth reconstruction stage and thus a stereoscopic image having a low stereoscopic effect is provided.

For example, in the related art, a stereoscopic image is generated by generating a depth in a low distortion region imaged from a fish-eyed image. Accordingly, there is a problem that a pin cushion region is difficult to be restored due to lack of overlapping of images imaged through a plurality of fisheye cameras. Accordingly, there is a need for a technology for improving a stereoscopic effect in all regions of an image imaged through a miniaturized 360-degree 3D virtual reality imaging apparatus.

DISCLOSURE

Technical Problem

The object of the present disclosure is to provide an electronic device capable of providing a distortion-free 360-degree 3D stereoscopic image by extracting a plurality of distortion-free sub images which cover a 360-degree entire region from images imaged using a plurality of cameras and extracting depths of the extracted sub images and an image processing method thereof.

Technical Solution

To obtain the above-described object, the present disclosure is to provide an electronic device which processes a 360-degree three-dimensional (3D) stereoscopic image, the electronic device including an imaging unit configured to image a plurality of images using a plurality of cameras; and a processor configured to divide the plurality of images into a plurality of left-eyed images and a plurality of right-eyed images, generate a left-eyed spherical image by projecting the plurality of left-eyed images of the plurality of images to a left unit sphere surface, generate a right-eyed spherical image by projecting the plurality of right-eyed images of the plurality of images to a right unit sphere surface, acquire depth information using the left-eyed spherical image and the right-eyed spherical image, and generate a 360-degree 3D stereoscopic image using the depth information.

The processor may divide at least one first sphere surface image corresponding to a designated field of view from an origin of the left-eyed spherical image, divide at least one second sphere surface image corresponding to the designated field of view from an origin of the right-eyed spherical image, and extract, in overlapping of the first sphere surface image and the second sphere surface image among the images imaged through the plurality of cameras, a first sub image by projecting the overlapped first sphere surface image to a plane corresponding to the designated field of view and a second sub image by projecting the overlapped second sphere surface image to a plane corresponding to the designated field of view.

The processor may split a unit sphere surface entire region of each of the left-eyed spherical image and the right-eyed spherical image into N regions with the designated field of view and extract a plurality of sub images corresponding to the N regions.

The processor may extract the first sub image and the second sub image from a first region in which a first left-eyed spherical image imaged through a first camera and a second right-eyed spherical image imaged through a second camera overlap with the designated field of view.

The processor may acquire the depth information from the first sub image and the second sub image using a stereo matching technology.

The processor may generate a 360-degree depth spherical image including the acquired depth information.

The processor may generate a 360-degree 3D stereoscopic image by rendering the 360-degree depth spherical image to at least one of the left-eyed spherical image and the right-eyed spherical image.

The processor may set the designated field of view so that errors in sizes of the left- and right-eyed spherical images and lengths of arcs on spherical spaces of the left- and right-eyed spherical images are within designated ranges.

To obtain the above-described object, the present disclosure is to provide an image processing method of an electronic device, the method including the steps of imaging a plurality of images using a plurality of cameras; dividing the plurality of images into left-eyed images and right-eyed images; generating a left-eyed spherical image by projecting the left-eyed images of the plurality of images to a left unit sphere surface and generating a right-eyed spherical image by projecting the right-eyed images of the plurality of images to a right unit sphere surface; acquiring depth information using the left-eyed spherical image and the right-eyed spherical image; and generating a 360-degree 3D stereoscopic image using the depth information.

The step of acquiring the depth information may further include the steps of: dividing at least one first sphere surface image corresponding to a designated field of view from an origin of the left-eyed spherical image and dividing at least one second sphere surface image corresponding to the designated field of view from an origin of the right-eyed spherical image; and extracting, in overlapping of the first sphere surface image and the second sphere surface image among the images imaged through the plurality of cameras, a first sub image by projecting the first sphere surface image to a plane corresponding to the designated field of view and a second sub image by projecting the second sphere surface image to a plane corresponding to the designated field of view.

The step of extracting may include dividing a unit sphere surface entire region of each of the left-eyed spherical image and the right-eyed spherical image into N regions with the designated field of view and extracting a plurality of sub images corresponding to the N regions.

The step of extracting may further include the step of extracting the first sub image and the second sub image from a first region in which a first left-eyed spherical image imaged through a first camera and a second right-eyed spherical image imaged through a second camera overlap each other with the designated field of view.

The step of acquiring the depth information may include acquiring the depth information from the first sub image and the second sub image using a stereo matching technology.

The step of generating the 360-degree 3D stereoscopic image may further include the step of generating a 360-degree depth spherical image including the acquired depth information.

The step of generating the 360-degree 3D stereoscopic image may further include the step of rendering the 360-degree depth spherical image to at least one of the left-eyed spherical image and the right-eyed spherical image.

The step of extracting may further include the step of setting the designated field of view so that errors in sizes of the left- and right-eyed spherical images and lengths of arcs on spherical spaces of the left- and right-eyed spherical images.

Advantageous Effects

The electronic device and an image processing method according to embodiments of the present disclosure may implement a small 3D system capable of providing generation of virtual reality (VR) content and augmented reality (AR) content with improved stereoscopic effect and provide a high quality distortion-free 360-degree 3D stereoscopic image.

DESCRIPTION OF DRAWINGS

The patent or application file contains at least one drawing executed in color. Copies of this patent or patent application publication with color drawing(s) will be provided by the Office upon request and payment of the necessary fee.

FIG. 5 is a diagram explaining an example that images imaged through a plurality of cameras are mapped to left and right spheres according to an embodiment of the present disclosure, FIG. 9 is a diagram explaining an example of generating a 360-degree 3D stereoscopic image according to an embodiment of the present disclosure, FIGS. 10 and 11 are diagrams illustrating a 360-degree depth panoramic image and a 360-degree color panoramic image according to an embodiment of the present disclosure.

BEST MODE

Figure 1:
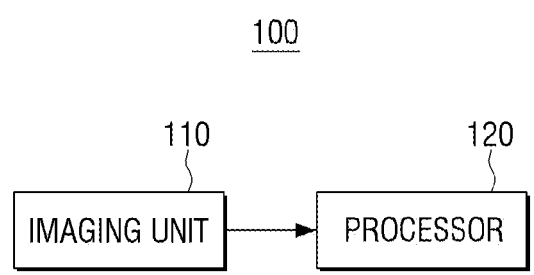
FIG. 1 is a schematic block diagram illustrating a configuration of an electronic device according to an embodiment of the present disclosure.

The terminology used in the specification will be described in brief and then the present disclosure will be described in detail.

As the terminology used herein is for the purpose of describing the specification and claims, general terms which are currently widely used are selected in consideration of functions in the present disclosure. It will be understood that the terms used herein may be changed depending on the intention of the technician in the art to which the present disclosure belongs, legal or technical interpretation, appearance of new technology, and the like.

A portion of the terms used herein may be terms arbitrarily selected by the applicant. It will be further understood that the terms used herein should be interpreted as the meaning defined herein. Unless otherwise defined, all terms (including technical and scientific terms) used herein should be interpreted as having a meaning that is consistent with their meaning in the context of the relevant art and will not be interpreted in an idealized or overly formal sense unless expressly so defined herein.

It should be understood that various alternatives, combinations and modifications could be devised by those skilled in the art. Various embodiments will now be described more fully with reference to the accompanying drawings in which some embodiments are shown. The techniques described herein are exemplary, and should not be construed as implying any particular limitation on the present disclosure. However, in the following description, it is understood that the technology described therein may not be limited to a specific embodiment, and various modifications, equivalents, and/or alternatives of the embodiments may be included therein without departing from the principles and spirit of the present disclosure. Also, well-known functions or constructions are not described in detail since they would obscure the invention with unnecessary detail.

It will be understood that, although the terms first, second, etc. may be used herein in reference to elements of the invention, such elements should not be construed as limited by these terms. The terms are used only to distinguish one element from other elements.

The terminology used herein to describe embodiments of the invention is not intended to limit the scope of the invention. The articles "a," "an," and "the" are singular in that they have a single referent; however, the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In exemplary embodiments, "module" or "unit" may perform at least one function or operation, and may be implemented with hardware, software, or a combination thereof. "plurality of modules" or "plurality of units" may be implemented with at least one processor (not shown) through integration thereof with at least one module other than "module" or "unit" which needs to be implemented with specific hardware.

Hereinafter, the exemplary embodiments will be described in detail to be easily carried out by those skilled in the art. However, the present disclosure may be implemented with various exemplary embodiments and are not limited to the exemplary embodiments described herein. For clarity, a portion unrelated to the description will be omitted in drawings. In the following description, unless otherwise described, the same reference numerals are used for the same elements when they are depicted in different drawings.

FIG. 1 is a schematic block diagram illustrating a configuration of an electronic device according to an embodiment of the present disclosure.

Referring to FIG. 1, an electronic device 100 may include an imaging unit 110 and a processor 120.

The electronic device 100 may be any display apparatus which may display an imaged image such as a head-mounted display (HDM), a smart phone, a laptop computer, and the like. The electronic device 100 may be any display apparatus which provides VR content and AR content.

The imaging unit 110 may be coupled to the electronic device 100 and may be coupled to an external apparatus. In response to the imaging unit 110 being coupled to the external apparatus, an image imaged through the imaging unit 110 may be transmitted to the electronic device 100 through wired or wireless communication.

The imaging unit 110 may be configured of a plurality of cameras. The plurality of cameras constituting the imaging unit 110 may be disposed to image a 360-degree region. For example, the imaging unit 110 may be configured of two cameras having field of views (FOVs) of 180 degrees or more.

According to an embodiment of the present disclosure, the plurality of cameras may be a camera having a wide-angle lenses such as a fisheye lens. However, this is merely exemplary to describe the present disclosure and thus this is not limited thereto.

For clarity, embodiments of the present disclosure will be described using the fisheye camera having the fisheye lens as an example in the present disclosure.

According to an embodiment of the present disclosure, two fisheye cameras having the FOVs of 180 degrees or more may image a 360-degree entire space. According to an embodiment of the present disclosure, the imaging unit 110 may be configured of at least four fisheye cameras to acquire a 360-degree image having low distortion. Each of the fisheye cameras may have a field of view of 180 degrees or more. The fisheye cameras may have the same FOV as each other or may have different FOVs from each other. Accordingly, the imaging unit 110 may be disposed to image points of the entire region of a 360-degree spherical space using at least two fisheye cameras.

The processor 120 may divide a plurality of images imaged through a plurality of cameras and received from the imaging unit 110 into a plurality of left-eyed images and a plurality of right-eyed images.

For example, the processor 120 may map a circular image imaged through the fisheye camera to an equirectangular image. The processor 120 may divide the equirectangular image into the left-eyed image and the right-eyed image by vertically splitting the equirectangular image at a center axis of the image.

The processor 120 may generate a left-eyed spherical image by mapping the plurality of left-eyed images to a left sphere and generate a right-eyed spherical image by mapping the plurality of right-eyed images to a right sphere. The phrase "mapping to the left/right sphere" may mean "projecting the left-/right-eyed image on a unit sphere surface".

The processor 120 may acquire depth information for the plurality of images imaged through the imaging unit 110 using the left-eyed spherical image and the right-eyed spherical image. The method of acquiring the depth information will be described later in detail with reference to FIGS. 6A to 8B.

The processor 120 may generate a 360-degree 3D stereoscopic image using the acquired depth information of the images. The processor 120 may generate the 360-degree 3D stereoscopic image by applying the depth information acquired from the overlapped left- and right-eyed spherical images to the at least one image of the left- and right-eyed spherical images. The processor 120 may be included in an image processing apparatus of the electronic device 100.

Figure 2:
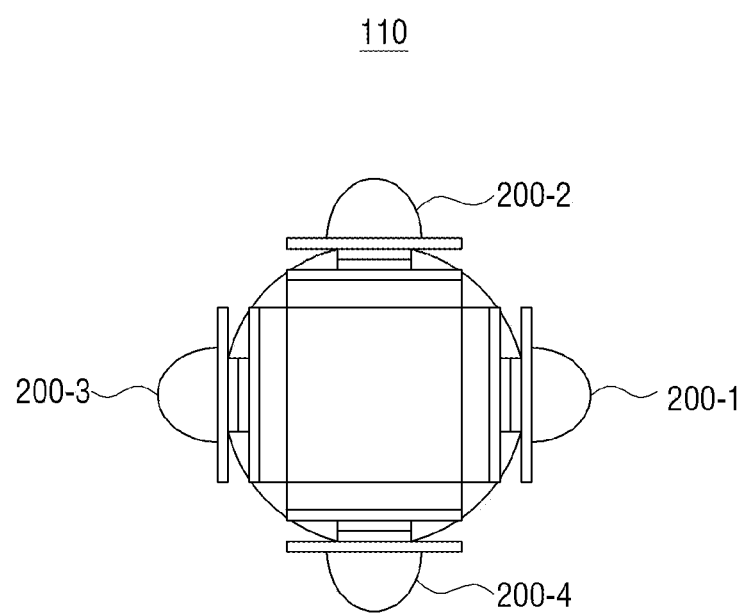
FIG. 2 is a diagram explaining an arrangement of a plurality of cameras according to an embodiment of the present disclosure.

FIG. 2 is a diagram explaining an arrangement of a plurality of cameras according to an embodiment of the present disclosure.

Referring to FIG. 2, the imaging unit 110 described in FIG. 1 may be configured of a plurality of cameras. In an embodiment of the present disclosure, the imaging unit 110 may be configured of at least four fisheye cameras 200-1, 200-2, 200-3, and 200-4. For clarity, four fisheye cameras are illustrated in the present disclosure. However, the number and arrangement of the fisheye cameras are not limited thereto and the imaging unit 110 may be configured of four or more fisheye cameras. For example, the imaging unit 110 may be configured of a plurality of cameras including a wide-angle lens. The wide-angle lens is merely exemplary to describe the present disclosure and the type of the lens is not limited thereto.

For example, as illustrated in FIG. 2, a first fisheye camera 200-1 may image the front of the first fisheye camera 200-1 within a designated FOV range. A second fisheye camera 200-2 may be arranged close to the first fisheye camera 200-1 and may image the front of the second fisheye camera 200-2 within a designated FOV range. A third fisheye camera 200-3 may be arranged close to the second fisheye camera 200-2 and may image the front of the third fisheye camera 200-3 within a designated FOV range. A fourth fisheye camera 200-4 may be arranged close to the third fisheye camera 200-3 and may image the front of the fourth fisheye camera 200-4 within a designated FOV range.

Accordingly, the plurality of fisheye cameras 200-1, 200-2, 200-3, and 200-4 according to an embodiment of the present disclosure may image an entire region of the 360-degree space.

The plurality of fisheye cameras 200-1, 200-2, 200-3, and 200-4 may be fixed to pedestals to perform an imaging operation in designated positions. The plurality of fisheye cameras 200-1, 200-2, 200-3, and 200-4 may be disposed to be fixed to adjacent cameras.

The example that the plurality of fisheye cameras 200-1, 200-2, 200-3, and 200-4 are disposed close to each other to image the entire region of the 360-degree space is described in the present disclosure, but this is merely exemplary to describe the present disclosure and the plurality of cameras may be disposed so that the plurality of cameras are not disposed close to each other.

Figure 3:
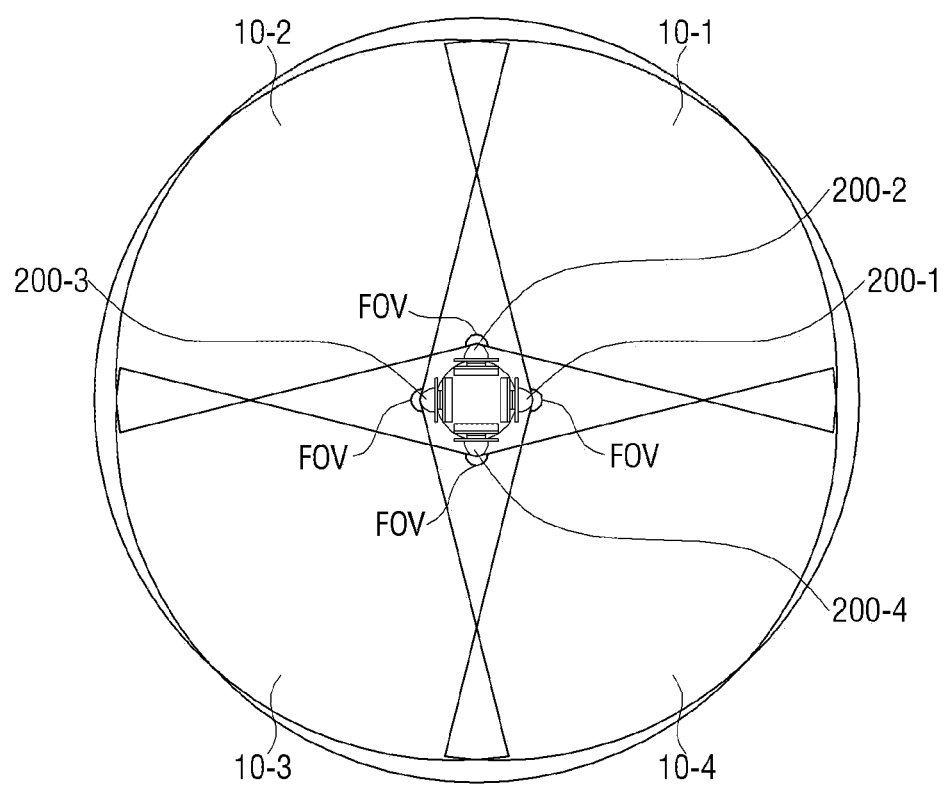
FIG. 3 is a diagram explaining an example of imaging an image using a plurality of cameras according to an embodiment of the present disclosure.

FIG. 3 is a diagram explaining an example of imaging a 360-degree 3D stereoscopic image using a plurality of cameras according to an embodiment of the present disclosure.

Referring to FIG. 3, the first camera 200-1 may image a first image 10-1 within the designated FOV range. The second camera 200-2 may image a second image 10-2 within the designated FOV range. The third camera 200-3 may image a third image 10-3 within the designated FOV range. The fourth camera 200-4 may image a fourth image 10-4 within the designated FOV range.

According to an embodiment of the present disclosure, each of the plurality of fisheye cameras 200-1, 200-3, 200-3, and 200-4 may have, for example, the FOV of 180 degrees or more (for example, 200 degrees). The first fisheye camera 200-1 may be disposed to a zero (0)-degree direction, the second fisheye camera 200-2 may be disposed to a 90-degree direction, a third fisheye camera 200-3 may be disposed to a 180-degree direction, and the fourth fisheye camera 200-4 may be disposed to a 270-degree direction.

In response to the FOV in each of the fisheye cameras being a minimum 180 degrees, the 360-degree image may be imaged using two fisheye cameras.

An example that the imaging unit is configured of fourth fisheye cameras to implement the distortion-free 360-degree 3D stereoscopic image will be described in the present disclosure. However, this is merely exemplary to describe the present disclosure and this is not limited thereto.

FIGS. 4A to 4D are diagrams explaining FOVs of a plurality of cameras according to an embodiment of the present disclosure.

The electronic device 100 may classify a plurality of images imaged through a plurality of cameras into a plurality of left-eyed images and a plurality of right-eyed images.

Figure 4A:
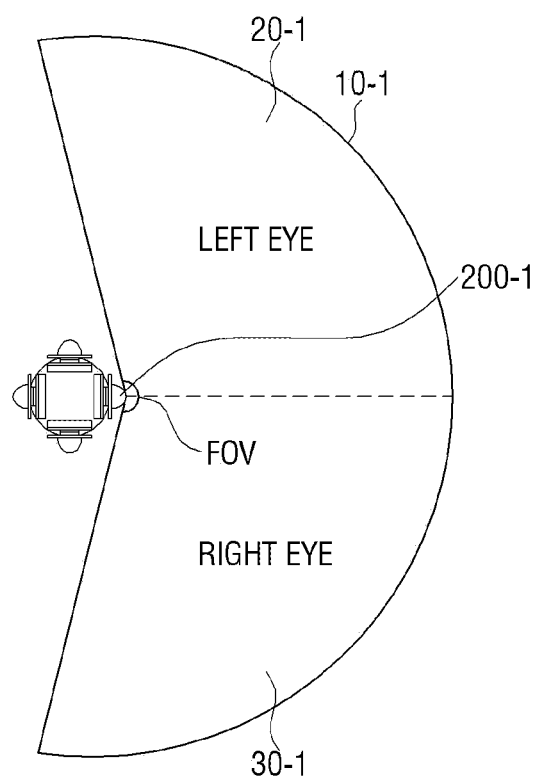
FIGS. 4A to 4D are diagrams explaining field of views of a plurality of cameras according to an embodiment of the present disclosure.

FIG. 4A is a diagram explaining the first image 10-1 imaged through the first fisheye camera 200-1 according to an embodiment of the present disclosure.

Referring to FIG. 4A, the first fisheye camera 200-1 may image the first image 10-1 within a FOV range of 200 degrees. The electronic device 100 may divide and classify a left-side image of the first image 10-1 into a left-eyed image 20-1 and a right-side image of the first image 10-1 into a right-eyed image 30-1.

Figure 4B:
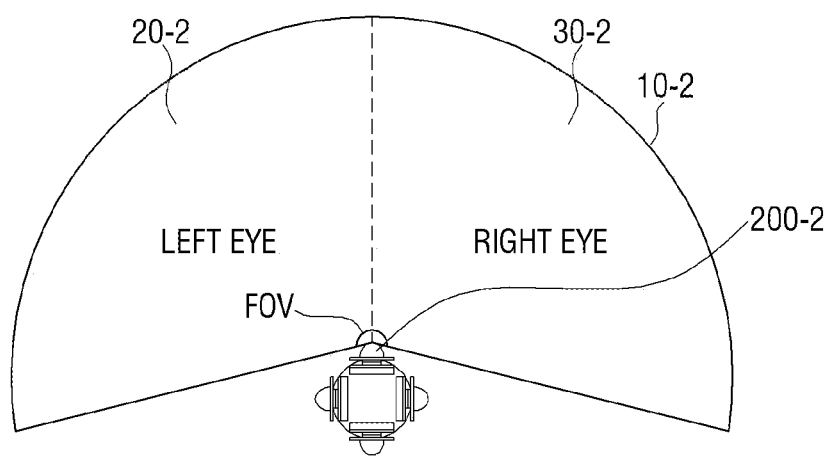

FIG. 4B is a diagram explaining the second image 10-2 imaged through the second fisheye camera 200-2 according to an embodiment of the present disclosure.

Referring to FIG. 4B, the second fisheye camera 200-2 may image the second image 10-2 within a FOV range of 200 degrees. The electronic device 100 may divide and classify a left-side image of the second image 10-2 into a left-eyed image 20-2 and a right-side image of the second image 10-2 into a right-eyed image 30-2.

Figure 4C:
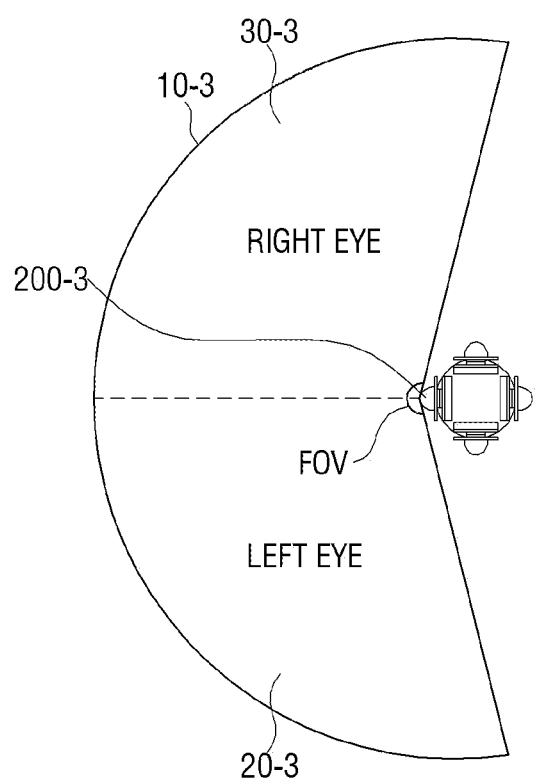

FIG. 4C is a diagram explaining the third image 10-3 imaged through the third fisheye camera 200-3 according to an embodiment of the present disclosure.

Referring to FIG. 4C, the third fisheye camera 200-3 may image the third image 10-3 within a FOV range of 200 degrees. The electronic device 100 may divide and classify a left-side image of the third image 10-3 into a left-eyed image 20-3 and a right-side image of the third image 10-3 into a right-eyed image 30-3.

Figure 4D:
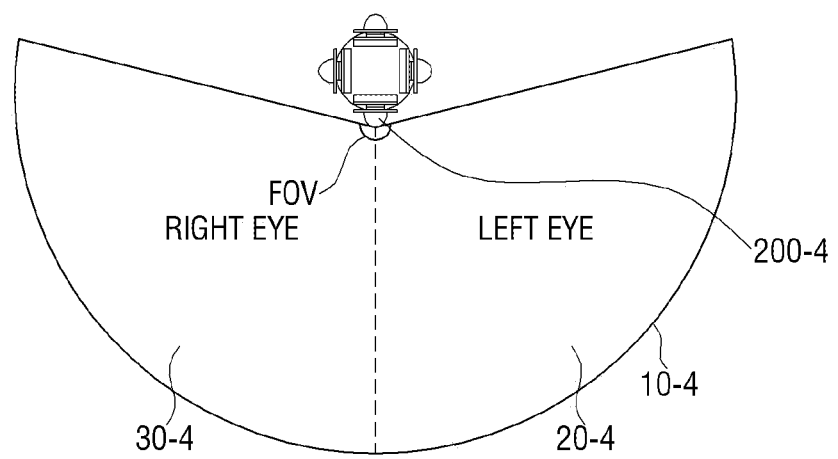

FIG. 4D is a diagram explaining the fourth image 10-4 imaged through the fourth fisheye camera 200-4 according to an embodiment of the present disclosure.

Referring to FIG. 4D, the fourth fisheye camera 200-4 may image the second image 10-4 within a FOV range of 200 degrees. The electronic device 100 may divide and classify a left-side image of the fourth image 10-4 into a left-eyed image 20-4 and a right-side image of the second image 10-4 into a right-eyed image 30-4.

For example, the electronic device 100 may image points of the 360-degree entire space using the first fisheye camera 200-1 illustrated in FIG. 4A and the third fisheye camera 200-3 illustrated in FIG. 4C. The electronic device 100 may image points of the 360-degree entire space using the second fisheye camera 200-2 illustrated in FIG. 4B and the fourth fisheye camera 200-4 illustrated in FIG. 4D.

As illustrated in FIG. 3, the image 10-1, 10-2, 10-3, and 10-4 imaged through the fisheye cameras 200-1, 200-2, 200-3, and 200-4 may overlap the images imaged through other cameras among the plurality of fisheye cameras 200-1, 200-2, 200-3, and 200-4.

For example, as illustrated in FIG. 4A, the first image 10-1 imaged through the first fisheye camera 200-1 may overlap the second and fourth images 10-2 and 10-4 imaged through the second and fourth fisheye cameras 200-2 and 200-4 close to the first fisheye camera 200-1. For clarity, the example that the image imaged through each of the plurality of fisheye cameras overlaps the images imaged through other cameras close to the fisheye cameras is described in the present disclosure, but this is merely exemplary and this is not limited thereto.

Specifically, the left-eyed image 20-1 of the first image 10-1 illustrated in FIG. 4A may overlap the right-eyed image 30-2 of the second image 10-2 illustrated in FIG. 4B. The right-eyed image 30-1 of the first image 10-1 illustrated in FIG. 4A may overlap the left-eyed image 30-4 of the fourth image 10-4 illustrated in FIG. 4D.

In another example, the second image 10-2 imaged through the second fisheye camera 200-2 illustrated in FIG. 4B may overlap the third image 10-2 and the first image 10-1 imaged through the third fisheye camera 200-2 and the first camera 200-1 close to the second fisheye camera 200-2.

Specifically, the left-eyed image 20-2 of the second image 10-2 illustrated in FIG. 4B may overlap the right-eyed image 30-3 of the third image 10-3 illustrated in FIG. 4C.

In another example, the third image 10-3 imaged through the third fisheye camera 200-3 illustrated in FIG. 4C may overlap the second image 10-2 through the second camera 200-2 close to the third fisheye camera 200-3 and the fourth image 10-4 imaged through the fourth camera 200-4 close to the third fisheye camera 200-3.

Specifically, the left-eyed image 20-3 of the third image 10-3 illustrated in FIG. 4C may overlap the right-eyed image 30-4 of the fourth image 10-4 illustrated in FIG. 4D.

Accordingly, as illustrated in FIG. 3, the left-eyed images 20-1, 20-2, 20-3, and 20-4 in the images 10-1, 10-2, 10-3, and 10-4 imaged through the fisheye cameras 200-1, 200-2, 200-3, and 200-4 may overlap the right-eyed images 30-1, 30-3, 30-3, and 30-4 imaged through the fisheye cameras close thereto.

FIG. 5 is a diagram explaining an example that images imaged through a plurality of cameras are mapped to the left and right spheres according to an embodiment of the present disclosure.

The electronic device 100 may generate the left-eyed spherical image by projecting the left-eyed images of the plurality of images imaged through the plurality of cameras on the left unit sphere surface and generate the right-eyed spherical image by projecting the right-eyed images of the plurality of images on the right unit sphere surface.

Referring to FIG. 5, the plurality of fisheye cameras 200-1, 200-2, 200-3, and 200-4 described in FIG. 2 may image the first image 10-1, the second image 10-2, the third image 10-3, and the fourth image 10-4 corresponding to the fisheye cameras within the FOV regions. The images imaged through the fisheye cameras 200-1, 200-2, 200-3, and 200-4 may be circular images 10-2, 10-2, 10-3, and 10-4.

The electronic device 100 may transform the plurality of circular images 10 imaged through the fisheye cameras into a plurality of equirectangular images 20 through fisheye camera calibration.

According to an embodiment of the present disclosure, the electronic device 100 uses an omnidirectional camera calibration method, but this is merely exemplary to describe the present disclosure and this is not limited thereto. The calibration method of transforming the circular image imaged through the fisheye camera into the equirectangular image is a known technology and thus detailed description therefor will be omitted herein.

The electronic device 100 may divide a plurality of equirectangular images 20-1, 20-2, 20-3, and 20-4 into left-eyed images 30-1, 30-2, 30-3, and 30-4 and right-eyed images 40-1, 40-2, 40-3, and 40-4. The electronic device 100 may divide the plurality of equirectangular images 20-1, 20-2, 20-3, and 20-4 into the left-eyed images and the right-eyed images by vertically splitting the plurality of equirectangular images at the center axes of the equirectangular images.

The electronic device 100 may generate a left-eyed spherical (panoramic) image 50 by projecting the left-eyed images 30-1, 30-2, 30-3, and 30-4 divided from the equirectangular images 20-1, 20-2, 20-3, and 20-4 on the left unit sphere surface.

The electronic device 100 may generate a right-eyed spherical (panoramic) image 60 by projecting the right-eyed images 40-1, 40-2, 40-3, and 40-4 divided from the equirectangular images 20-1, 20-2, 20-3, and 20-4 on the right unit sphere surface.

According to an embodiment of the present disclosure, the electronic device 100 may transform the circular image 10 imaged through the fisheye camera into the equirectangular image 20 using omni calibration. The electronic device 100 may implement the transformation through intrinsic parameters of the insides of the cameras.

However, to generate the spherical images 50 and 60 by projecting the equirectangular images 20 on the left and right unit sphere surfaces according to an embodiment of the present disclosure, the electronic device 100 may understand external parameters defined in a camera rig configured of the plurality of fisheye cameras.

To project the left- and right-eyed equirectangular images on the unit sphere surfaces, the electronic device 100 may extract an external parameter R|t of a camera which define positions of the cameras in the camera rig.

For example, a rotation matrix R may have three angular parameters, for example, yaw, pitch, and roll. According to an embodiment of the present disclosure, the pitch and roll angles may equal to a zero (0) degree and the yaw angle may be 0 degree, 90 degrees, 180 degrees, and 270 degrees to correspond to the fisheye cameras 200-1, 200-2, 200-3, and 200-4 illustrated in FIG. 2.

A translation vector t may be configured of three parameters, for example, x, y, and z which define a center displacement and a camera optical from a center point of the unit sphere.

In other words, according to an embodiment of the present disclosure, the yaw, pitch, and roll angles of the first camera 200-1 may be set to 0 degree.

To estimate the external parameters R|t of the camera according to an embodiment of the present disclosure, the electronic device 100 may select a plurality of feature points corresponding to the circular fisheye images. The electronic device 100 may minimize a sum of squares of a distance between corresponding points on a spherical map. The electronic device 100 may estimate the optical external parameters R of each of the fisheye cameras using a conjugate gradient method.

$$E(p) = \sum_{k=0}^{N_{ij}} |P_i(c_k^{ij}, p^i) - P_j(c_k^{ji}, p^j)|^2 \Big|_{i,j \in \{1,2,3,4\}, i \neq j} \quad \text{[Equation 1]}$$

Here, i and j may be the number of fisheye cameras constituting the camera rig, $N_{ij}$ may be the number of points corresponding the camera i and the camera j, $P_i$ a projection function in the camera i having an external parameter $p^i$, and $C_k^{ij}$ may be a coordinate of a k-th corresponding point of the camera i to the camera j.

The electronic device 100 may optimize the external parameters of the fisheye cameras through the above-described method and then project the left equirectangular images 30-1, 30-2, 30-3, and 30-4 and the right equirectangular images 40-1, 40-2, 40-3, and 40-4 which are 8 half equirectangular images into the spherical map 620 on the left unit sphere surface 50 and the right unit sphere surface 60.

To generate the 3D stereoscopic image according to an embodiment of the present disclosure, the electronic device 100 may acquire a 2D left-eyed image and a 2D right-eyed image which images one point from a virtual camera (for example, eye of a viewer).

The electronic device 100 may extract depth information of an image from the left-eyed spherical image 50 and the right-eyed spherical image 60 generated from the images imaged through the plurality of cameras.

Figure 6A:
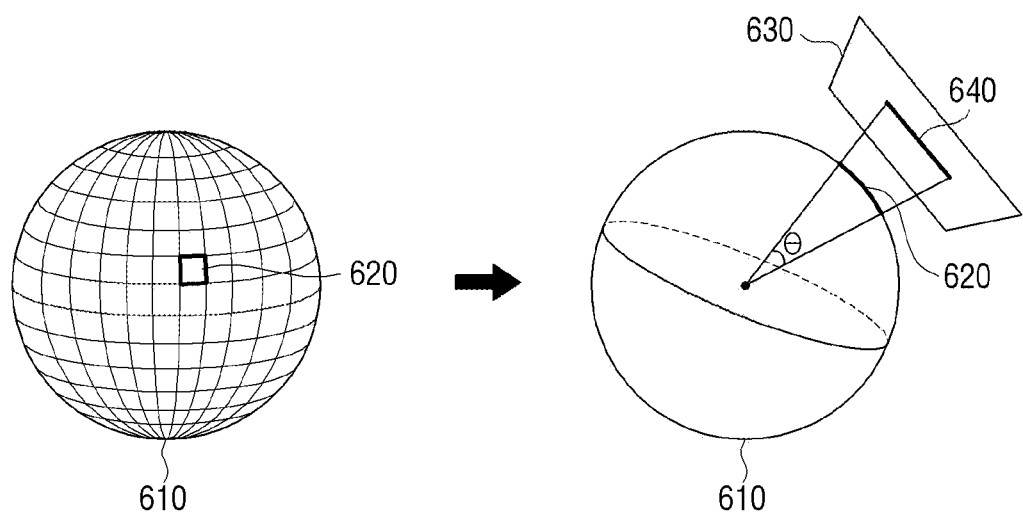
FIGS. 6A and 6B are diagrams explaining an example that an undistorted sub image is extracted from a spherical image according to an embodiment of the present disclosure.
Figure 6B:
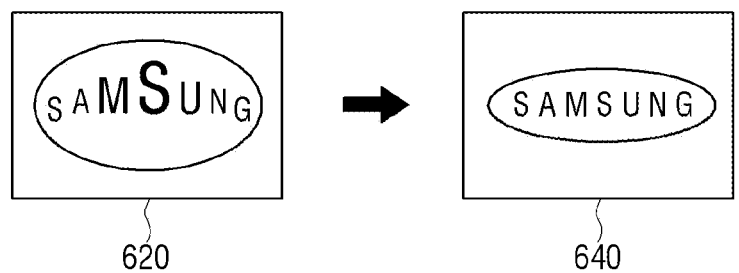

FIGS. 6A and 6B are diagrams explaining an example of extracting an undistorted sub image from a spherical image according to an embodiment of the present disclosure.

FIG. 6A is a diagram explaining a method of extracting the undistorted sub image by dividing a partial region of a unit sphere surface according to an embodiment of the present disclosure.

The electronic device 100 may extract a plurality of distortion-free sub images from the left-eyed spherical images and the right-eyed spherical images. The electronic device 100 may extract the depths of the left-eyed spherical image and the right-eyed spherical image through the plurality of extracted sub images.

FIG. 6A is a diagram explaining an example of extracting a plurality of distortion-free sub images from the spherical image (the left-eyed spherical image or the right-eyed spherical image).

For clarity, in the present disclosure, the left-eyed spherical image and the right-eyed spherical image will be described using one spherical image 610.

Referring to FIG. 6A, the electronic device 100 may divide a partial region 620 from the sphere surface of the left-eyed spherical image 610. In other words, the electronic device 100 may divide at least one first sphere surface image 620 corresponding to a designated FOV θ from the origin point of the left-eyed spherical image 610 from the left-eyed spherical image. The electronic device 100 may divide at least one second sphere surface image 620 corresponding to the designated FOV θ from the origin point of the right-eyed spherical image 610. Since the first sphere surface image and the second sphere surface region 620 are generated on the sphere surface, the image may be a distorted image 620.

In overlapping of the first sphere surface image divided from the left-eyed spherical image and the second sphere surface image divided from the right-eyed spherical image, the electronic device 100 may extract a first sub image 640 corrected by projecting the first sphere surface image into a plane 630 corresponding to the designated FOV θ. A method of extracting the second sub image from the right-eyed spherical image is the same as the method of extracting the first sub image.

For clarity, the first sub image and the second sub image 640 is indicated by a line in the present disclosure, but the sub image 640 indicated by the line may mean that an epipolar curve of the sphere surface image 620 is linearly transformed and then is transformed to a plane image 630 corresponding to the sphere surface image 620 through a stereo rectification algorithm.

The electronic device 100 may set the designated FOV θ so that an error in sizes of the left- and right-eyed spherical images and an error in lengths of arcs on the spherical spaces of the left- and right-eyed spherical images. The lengths of the arcs on the spherical spaces may mean the lengths of the arcs on N-divided spherical spaces in response to the left- and right-eyed spherical images being divided by N vertically and horizontally. For example, the electronic device 100 may equally vertical-split the left- and right-eyed spherical images 610 by N. The electronic device 100 may equally horizontal-split the N-vertically split left- and right-eyed spherical images 610 by N.

For example, the partial region 620 among the N-split left-eyed spherical images may have the FOV θ designated from the origin of the left-eyed spherical image.

According to an embodiment of the present disclosure, the electronic device 100 may extract the depths of the sub images extracted from the left- and right-eyed spherical images and then restore the extracted sub images to the depth spherical image again. Accordingly, a blending artifact may occur in the process of blending the plurality of sub images 640 and restoring the 360-degree spherical space again. The electronic device 100 may determine the FOV θ for extracting the sub image through known various calculation methods to minimize the blending artifact in the depth spherical image.

According to an embodiment of the present disclosure, the electronic device 100 may have, for example, the camera rig configured of four fisheye cameras. The electronic device 100 may extract the depths from the plurality of extracted sub images and restore the extracted sub images to the 360-degree spherical depth image by blending depth images.

The electronic device 100 may split the spherical spaces of the left- and right-eyed spherical images, for example, into 32 regions to minimize the blending artifact in generating of the depth spherical image.

The electronic device 100 needs uniform latitude and longitude for dividing the left- and right-eyed spherical images to the designated FOV θ to uniformly extract the plurality of distortion-free sub images from the left- and right-eyed spherical images. According to an embodiment of the present disclosure, the electronic device may use a polyhedral model to extract the uniform latitude and longitude from the left- and right-eyed spherical images. For example, the electronic device may transform the surfaces of the left- and right-eyed spherical images to a polyhedron. The electronic device may extract the latitude and longitude of a point corresponding to a center of each surface constituting the polyhedron from the centers of the left- and right-eyed spherical images.

For example, the electronic device may transform the surface of each of the left- and right-eyed spherical images to a regular icosahedron, s regular modified icosahedron, a regular truncated icosahedron, and the like and extract the latitude and longitude of the center point of each of the surfaces constituting the polyhedron from the centers of the left- and right-eyed spherical images.

For example, the electronic device 100 may acquire 20 designated FOV θ using an icosahedral model. The electronic device 100 may acquire 32 designated FOV θ using the regular modified icosahedral model and a regular truncated icosahedral model.

In using of the polyhedral model, the plane of the polyhedron is configured of a regular pentagon and a regular hexagon. However, the polyhedral model is used to acquire the designated FOV θ in the present disclosure, but in response to the plurality of sub images being extracted, the distortion-free sub images having a rectangular plane may be extracted for the convenience of image processing.

The electronic device 100 may set the error in the sizes of the left- and right-eyed spherical images and the error in the lengths of arcs on the divided spherical spaces of the left- and right-eyed spherical images to be, for example, within 2% to extract the plurality of distortion-free sub images. The electronic device 100 may acquire 32 divided spherical spaces, for example, by employing the regular modified icosahedral model. In response to the 360-degree spherical depth image being generated again from the plurality of sub images extracted in the 32 divided spherical spaces, the smoothing of the 360-degree spherical depth image may be differently implemented according to an overlapping ratio between the depth images generated from the sub images.

For example, the electronic device 100 may set the overlapping ratio between the depth images to about 15 to 20%. The electronic device 100 may set the designated left and right and up and down FOVs θ for dividing the plurality of sphere surface images from the left- and right-eyed images to 45 to 60 degrees. However, the above-described examples are merely exemplary and thus this is not limited thereto.

The electronic device 100 may extract the plurality of sub images from the entire regions of the sphere surface of the left- and right-eyed spherical images with the designated FOV through the above-described method.

FIG. 6B is a diagram illustrating a distorted sphere surface image and an undistorted sub image described in FIG. 6A.

It can be seen in FIG. 6B that the partial region 620 divided from the unit sphere surface 610 illustrated in FIG. 6A is represented with a distorted image (SAMSUNG) 620 on the sphere surface. However, it can be seen that the corrected image 640 projected into the quadrangular image plane illustrated in FIG. 6A is represented with the distortion-corrected image (SAMSUNG) 640.

Figure 7:
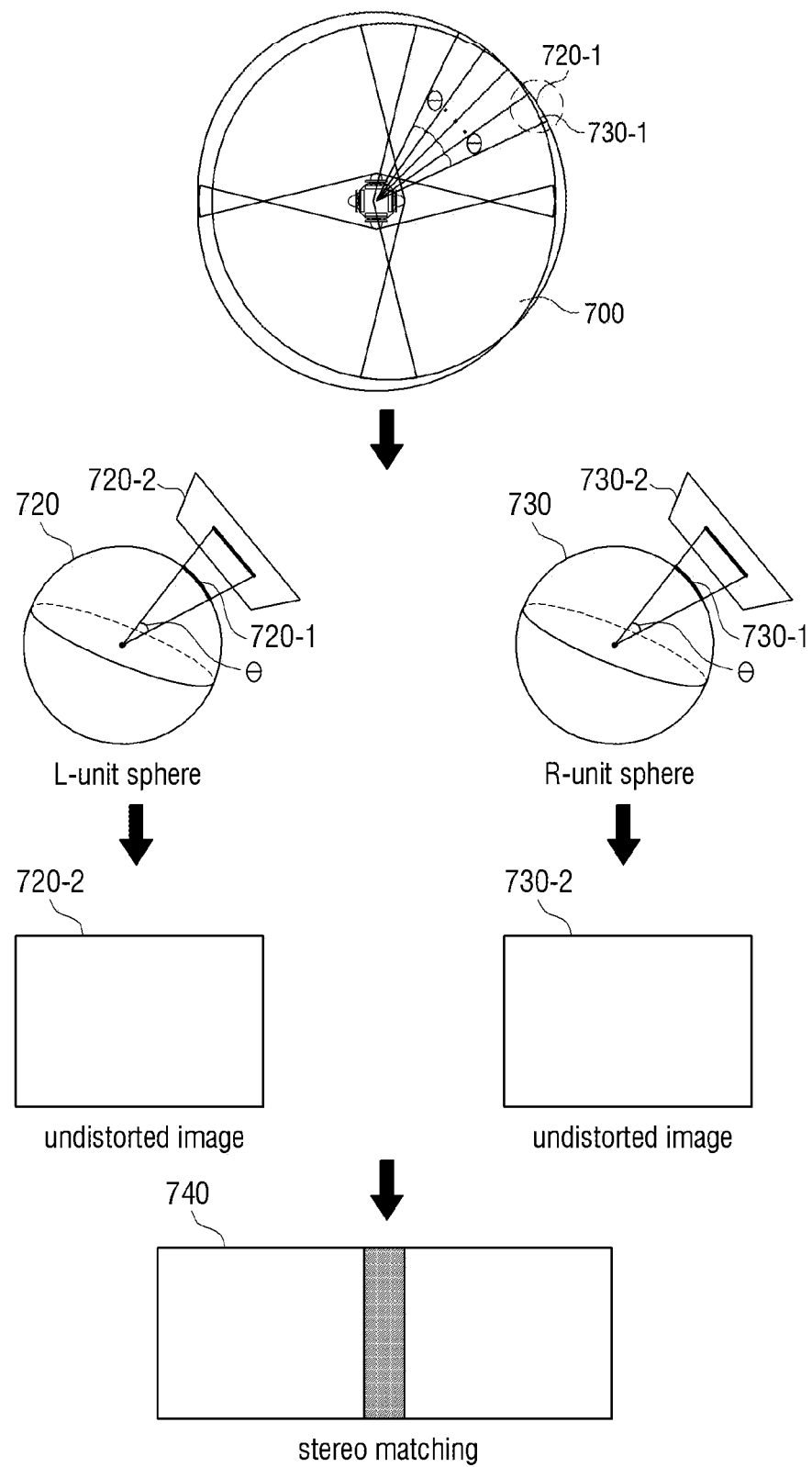
FIG. 7 is a diagram explaining an example that depths are extracted from a plurality of undistorted sub images according to an embodiment of the present disclosure.

FIG. 7 is a diagram explaining an example of extracting depths from a plurality of undistorted sub images according to an embodiment of the present disclosure.

As illustrated in FIG. 3, according to an embodiment of the present disclosure, a plurality of fisheye cameras may have FOVs of at least 180 degrees or more. Accordingly, the images imaged through the fisheye cameras may sufficiently overlap images imaged through cameras adjacent thereto and images imaged through cameras unadjacent thereto and the electronic device 100 may generate the left-eyed spherical image and the right-eyed spherical image in whole 360 degrees using at least four fisheye cameras.

Referring to FIG. 7, the electronic device 100 may extract a plurality of sub images from an image perspective-projected on the unit sphere surface.

The electronic device 100 may generate the plurality of undistorted sub images from the plurality of perspective-projected images which cover the entire region of the unit sphere surface.

As described in FIGS. 3 and 4A to 4D, the plurality of images imaged through the plurality of cameras may overlap the images imaged through the adjacent cameras and the images imaged through the unadjacent cameras. The portion of the overlapping images may be the left-eyed spherical image 720 of the first camera and another portion of the overlapping images may be the right-eyed image 730 of the second camera.

As described in FIGS. 4A to 4D, for example, the left-eyed spherical image 20-1 of the first image 10-1 imaged through the first fisheye camera 200-1 may overlap the right-eyed spherical image 30-1 of the second image 10-2 imaged through the second fisheye camera 200-2.

As described in FIG. 6A, the electronic device 100 may divide the first sphere surface image from the left-eyed spherical image 20-1 of the first image 10-1 with the designated FOV and extract the undistorted first sub image 640 by projecting the first sphere surface image on the plane 630 corresponding to the designated FOV. The electronic device 100 may extract the undistorted second sub image 640 from the right-eyed spherical image 30-1 of the second image 10-2 through the same method as the above-described method.

For clarity, it is defined in FIG. 7 that the left-eyed spherical image 720 is imaged through the first camera and the right-eyed spherical image 730 is imaged through the second camera.

In overlapping of a first sphere surface image 720-1 of the left-eyed spherical image 720 imaged through the first camera and a second sphere surface image 730-1 of the right-eyed spherical image 730 imaged through the second camera, the electronic device 100 may extract the plurality of sub images 720-2 and 730-2 from the first sphere surface image 720-1 and the second sphere surface image 730-1 overlapping each other. The method of extracting the plurality of sub images is described in FIG. 6A and thus detailed description therefor will be omitted.

According to an embodiment of the present disclosure, the electronic device 100 may transform the sphere surface images 720-1 and 730-1 into rectangular undistorted sub images 720-2 and 730-2. Since the extracted sub images 720-2 and 730-2 are the left- and right-eyed images, the electronic device 100 may detect the depth information from the plurality of extracted sub images 740. The electronic device 100 may acquire the depth information of the plurality of extracted sub images using the stereo matching technology. The stereo matching technology is known technology and thus detailed description therefor will be omitted in the present disclosure.

Figure 8A:
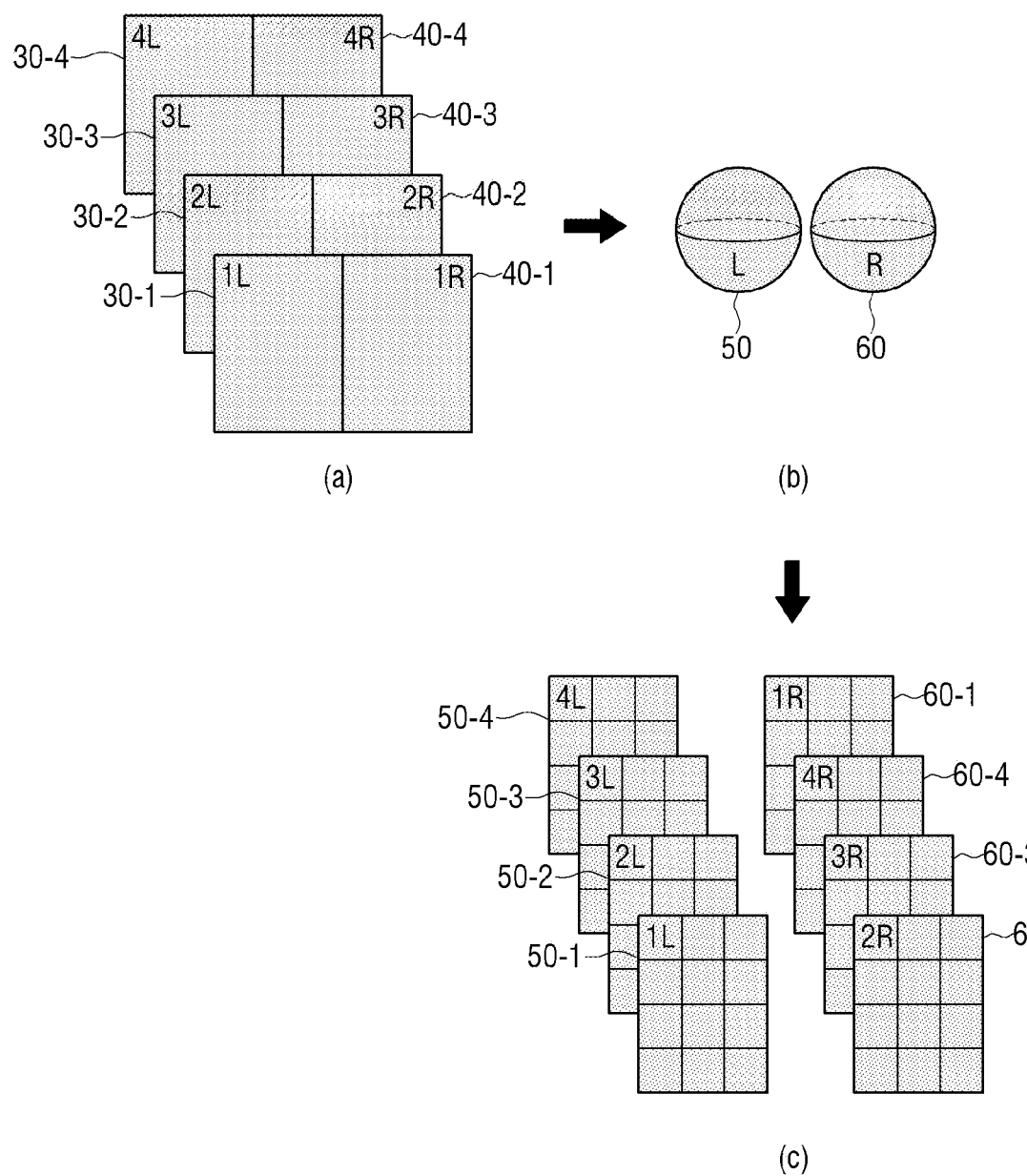
FIGS. 8A and 8B are diagrams explaining an example that a plurality of undistorted sub images are extracted from left and right spherical images according to an embodiment of the present disclosure.

FIG. 8A is a diagram explaining an example of extracting a plurality of undistorted sub images from left and right spherical images according to an embodiment of the present disclosure. For example, according to an embodiment of the present disclosure, the images imaged through the plurality of fisheye cameras may be a plurality of circular images.

Referring to FIG. 8A, the electronic device 100 may transform the circular images imaged through the plurality of fisheye cameras into a plurality of equirectangular images as illustrated in FIG. 5. The electronic device 100 may align the transformed equirectangular images into the left half equirectangular images 30-1, 30-3, 30-3, and 30-4 and the right half equirectangular images 40-1, 40-2, 40-3, and 40-4 by vertically splitting the transformed equirectangular images at the center points of the equirectangular images.

The electronic device 100 may generate the left-eyed spherical image 50 by projecting and mapping the left half images 30-1, 30-2, 30-3, and 30-4 among the aligned left and right half equirectangular images to the left unit sphere surface 50. The electronic device 100 may generate right-eyed spherical image 60 by projecting and mapping the right half equirectangular images 40-1, 40-2, 40-3, and 40-4 to the right unit sphere surface 60.

The electronic device 100 may extract the plurality of undistorted sub images 50-1, 50-2, 50-3, and 50-4 from the left-eyed spherical image 50 and extract the plurality of undistorted sub images 60-1, 60-2, 60-3, and 60-4 from the right-eyed spherical image 60 as illustrated in FIGS. 6A and 7. As illustrated in FIG. 8A, the extraction order of the plurality of sub images 60-1, 60-2, 60-3, and 60-4 extracted from the right-eyed spherical image 60 which overlap the plurality of undistorted sub images 50-1, 50-2, 50-3, and 50-4 extracted from the left-eyed spherical image 50 may be different from the extraction order of the plurality of undistorted sub images 50-1, 50-2, 50-3, and 50-4.

In other words, the electronic device 100 may extract the plurality of sub images from a first sub image in which the first left-eyed spherical image imaged through the first camera and the second right-eyed spherical image imaged through the second camera overlap with the designated FOV.

For example, in the region in which the left-eyed image 20-1 of the first image 10-1 imaged through the first fisheye camera 200-1 and the right-eyed image 30-1 of the second image 10-2 imaged through the second fisheye camera 200-2 overlap each other illustrated in FIGS. 4A and 4B, the electronic device 100 may extract the plurality of sub images 50-1 and 60-2 split with the designated FOV. In the region in which the left-eyed image 20-2 of the second image 10-2 imaged through the second fisheye camera 200-2 and the right-eyed image 30-3 of the third image 10-3 imaged through the third fisheye camera 200-3 overlap each other, the electronic device 100 may extract the plurality of sub images 50-2 and 60-3 split with the designated FOV. In the region in which the left-eyed image 20-3 of the third image 10-3 imaged through the third fisheye camera 200-3 and the right-eyed image 30-4 of the second image 10-4 imaged through the fourth fisheye camera 200-2, the electronic device 100 may extract the plurality of sub images 50-3 and 60-4 split with the designated FOV. In the region in which the left-eyed image 20-4 of the fourth image 10-4 imaged through the fourth fisheye camera 200-4 and the right-eyed image 30-1 of the first image 10-1 imaged through the first fisheye camera 200-1 overlap each other, the electronic device 100 may extract the plurality of sub images 50-4 and 60-1 split with the designated FOV.

However, the above-described example is merely exemplary to describe the present disclosure and the overlapping region may be differently implemented according to the arrangement of the plurality of cameras in response to the number of fisheye cameras constituting the camera rig being 5 or more or 3 or less.

Figure 8B:
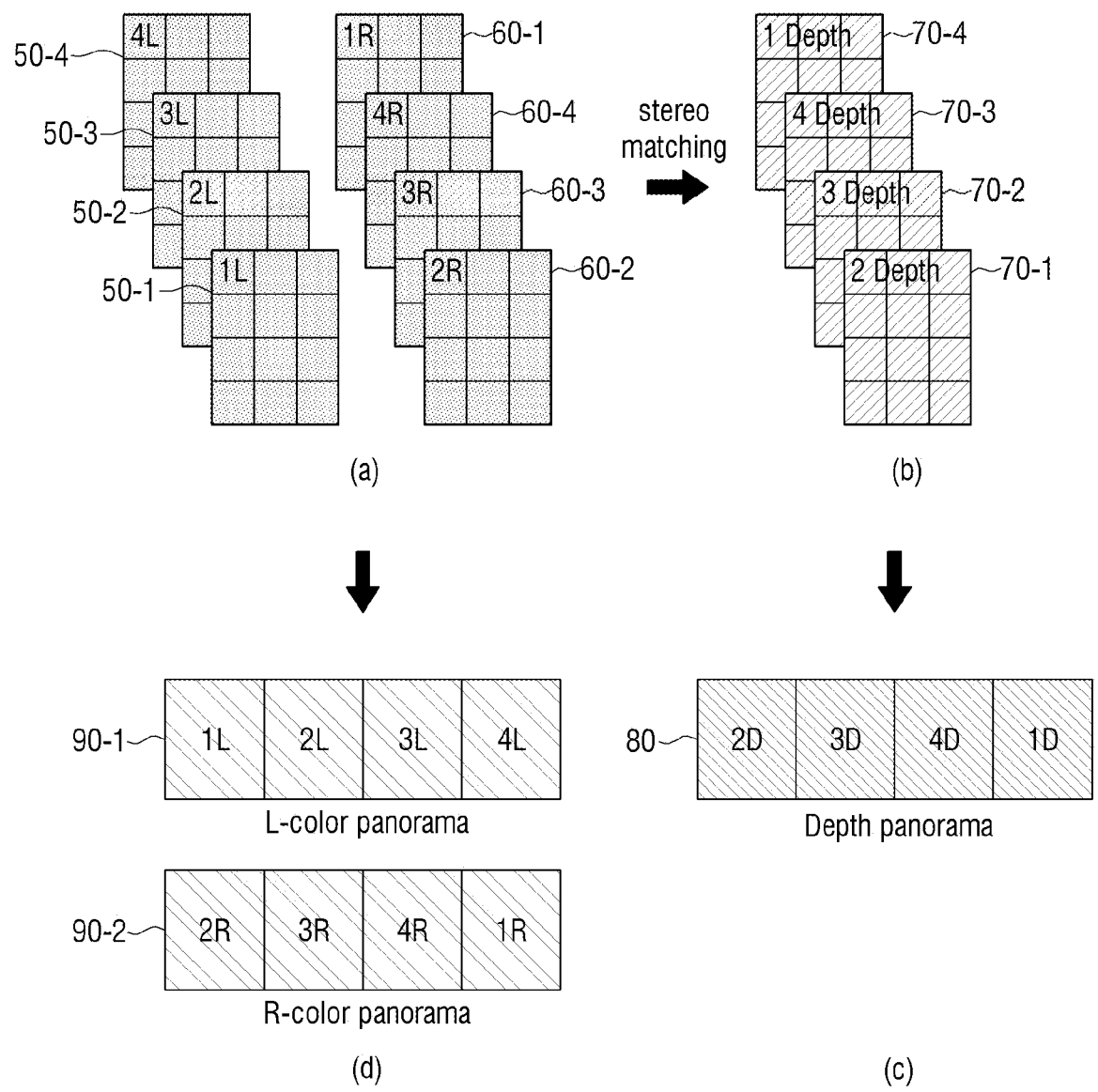

FIG. 8B is a diagram explaining an example of generating a color spherical image and a depth spherical image from the plurality of extracted sub images according to an embodiment of the present disclosure.

Referring to FIG. 8B, the electronic device 100 may acquire the depth information from the plurality of extracted sub images using the stereo matching algorithm.

For example, the electronic device 100 may generate the depth image 70-1 having the depth information by acquiring the depth information from the plurality of sub images 50-1 extracted from the left-eyed spherical image and the plurality of sub images 60-2 extracted from the right-eyed spherical image overlapping the plurality of sub images 50-1. The electronic device 100 may generate the depth images 70-2, 70-3, and 70-4 having the depth information by acquiring the depth information from the remaining left-eyed sub images 50-2, 50-3, and 50-4 and the remaining right-eyed sub images 60-3, 60-4, and 60-5 overlapping the left-eyed sub images 50-2, 50-3, and 50-4.

The electronic device 100 may generate the depth spherical image 80 by stitching the depth images 70-1, 70-2, 70-3, and 70-4 and restoring the spherical image again.

The electronic device 100 may generate the left color spherical image 90-1 by stitching all the plurality of sub images 50-1, 50-2, 503, and 50-4 extracted from the left-eyed spherical image. The electronic device 100 may generate the right color spherical image 90-2 by stitching all the plurality of sub images 60-1, 60-2, 60-3, and 60-4 extracted from the right-eyed spherical image.

FIG. 9 is a diagram explaining an example of generating a 360-degree 3D stereoscopic image according to an embodiment of the present disclosure.

Referring to FIG. 9, the electronic device 100 may generate 360-degree stereoscopic images 95-1 and 95-2 by rendering the depth spherical image 80 to at least one of the left spherical image 90-1 and the right spherical image 90-2.

The electronic device 100 may perform rendering on the depth spherical image to the left and right color spherical images using the depth image-based rendering (DIBR) technology. Since the left and right color spherical images are 360-degree 2D images, the electronic device 100 may generate the 360-degree 3D stereoscopic image having a stereoscopic effect by rendering the depth spherical image to the left and right color spherical images.

According to an embodiment of the present disclosure, the electronic device 100 may generate the 360-degree color and depth panoramic images by processing the generated left and right color spherical images and the depth spherical image using various image processing technologies such as seamless stitching. The electronic device 100 may generate the 360-degree 2D left/right color panoramic images generated from the left- and right-eyed spherical image. The electronic device 100 may generate the 360-degree depth panoramic image from the depth spherical image. The phrase "rendering of the spherical depth image to the left- and right-eyed spherical images" in the present disclosure may mean rendering of 360-degree depth panoramic image to the 360-degree 2D color panoramic image.

According to an embodiment of the present disclosure, the electronic device 100 may use depth image-based rendering (DIBR) and DIBR using the 2D image may not be a loop-closed solution. To generate 360-degree virtual reality (VR) content according to an embodiment of the present disclosure, the last column of the image has to be the loop-closed content.

To implement the depth-based 3D VR rendering according to an embodiment of the present disclosure, the following algorithm may be used in the DIBR.

if(u<0), d'(u, v)=d(u+width, v)
if(u>width), d'(u, v)=d(u−width, v)

Here, (u,v) may be a position of a pixel in a rendered image.

The electronic device 100 may generate the 360-degree 3D stereoscopic image by rendering the depth spherical image to the left-eyed spherical image and the right-eyed spherical image illustrated in FIG. 8.

Figure 10:
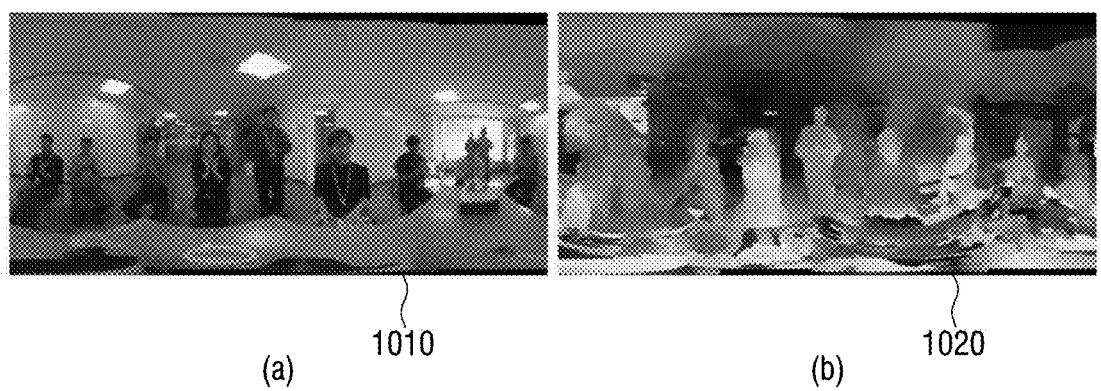

FIGS. 10 and 11 are diagrams illustrating a 360-degree depth panoramic image and a 360-degree color panoramic image according to an embodiment of the present disclosure.

FIG. 10(A) illustrates the 360-degree color panoramic image generated from a 360-degree color spherical image 1010 generated through the electronic device 100 using the stitching technology. In other words, the image 1010 is a 2D image. FIG. 10(b) illustrates a 360-degree depth panoramic image 1020 from the 360-degree depth spherical image generated by extracting a depth from the image of FIG. 10(A) using the stitching technology. Accordingly, the electronic device 100 may generate the 360-degree 3D stereoscopic image by rendering the 360-degree 2D color panoramic image 1010 and the 360-degree depth panoramic image 1020.

FIG. 11(A) illustrates a 360-degree left color panoramic image 90-1 generated from the left-eyed spherical images imaged through a plurality of fisheye cameras described in FIG. 9. FIG. 11(B) illustrates a 360-degree right color panoramic image 90-2 generated from the right-eyed spherical images imaged through the plurality of fisheye cameras described in FIG. 9. FIG. 11(c) illustrates a 360-degree depth panoramic image 80 generated from the depth spherical image generated using the depth information extracted from the left- and right-eyed spherical images described in FIG. 9.

In rendering of the image of FIG. 11(C) to the images of FIGS. 11(A) and 11(B) according to an embodiment of the present disclosure, the distortion-free dedicate 360-degree 3D stereoscopic panoramic image may be generated.

In other words, the electronic device 100 may extract the depth information of all pixels of a 360-degree spherical space according to an embodiment of the present disclosure.

Accordingly, according to an embodiment of the present disclosure, the electronic device 100 may generate the 360-degree 3D stereoscopic image as content for VR/AR of which a stereoscopic effect is controlled. The present disclosure may be implemented to generate the distortion-free 360-degree 3D stereoscopic panorama, for example, using at least four fisheye cameras and thus the electronic device 100 may generate the 360-degree 3D stereoscopic image having a large stereoscopic effect with a small system.

Figure 12:
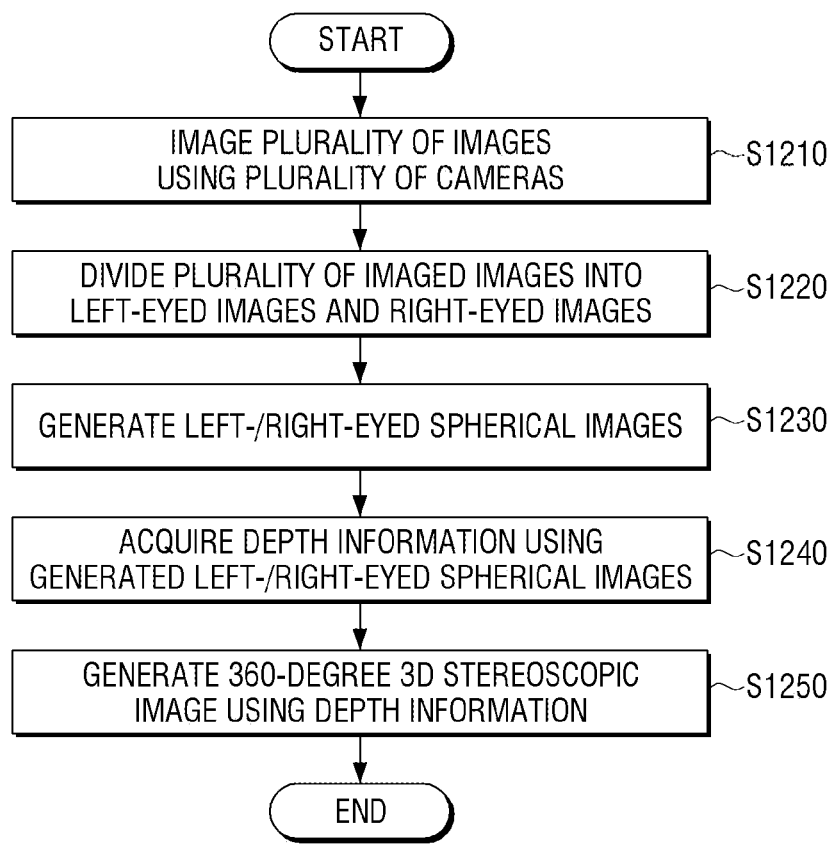
FIG. 12 is a flowchart explaining a method of generating a 360-degree 3D stereoscopic image using depth information according to an embodiment of the present disclosure.

FIG. 12 is a flowchart explaining a method of generating a 360-degree 3D stereoscopic image using depth information according to an embodiment of the present disclosure.

Referring to FIG. 12, in operation S1210, the electronic device 100 may image a plurality of images to correspond to FOVs of a plurality of cameras using the plurality of cameras.

For example, the plurality of cameras may be fisheye cameras having a wide-angle lens such as a fisheye lens. To acquire a distortion-free stereoscopic image from an entire region of a 360-degree space according to an embodiment of the present disclosure, the fisheye cameras may include at least four cameras and each of the fisheye cameras may have a FOV of 180 degree or more. According to an embodiment of the present disclosure, the plurality of fisheye cameras may include at least two cameras and may be disposed to image the 360-degree entire region. The plurality of fisheye cameras may include five or more cameras.

In operation S1220, the electronic device 100 may classify the plurality of imaged images into a plurality of left-eyed images and a plurality of right-eyed images. For example, in response to the plurality of cameras being configured of cameras having a wide-angle lens such as a fisheye lens according to an embodiment of the present disclosure, the electronic device 100 may map the image images to equirectangular images using calibration data. The electronic device 100 may divide images, which are transformed to the equirectangular images from the circular images, into left half equirectangular images and right half equirectangular images by vertically splitting the images.

In operation S1230, the electronic device 100 may generate the left-eyed spherical image by projecting/mapping the left-eyed images of the plurality of images to the left unit sphere surface. The electronic device 100 may generate the right-eyed spherical image by projecting/mapping the right-eyed images of the plurality of images to the right unit sphere surface.

In other words, the electronic device 100 may project the left equirectangular images of the aligned left/right equirectangular images to the left unit sphere surface and project the right equirectangular images to the right unit sphere surface. For example, the electronic device 100 may generate the left-eyed spherical images and the right-eyed spherical images by transforming the circular images imaged through the plurality of fisheye cameras to the equirectangular images and dividing the transformed equirectangular images to the left- and right-eyed images.

In operation S1240, the electronic device 100 may acquire depth information using the left- and right-eyed spherical images. The electronic device 100 may extract a plurality of undistorted sub images from the left- and right-eyed spherical images in a region in which the left-eyed spherical image and the right-eyed spherical image overlap each other with a designated FOV. The method of extracting the plurality of undistorted sub images is described in detail in the present disclosure and thus detailed description thereof will be omitted herein.

The electronic device 100 may extract depths from the plurality of extracted sub images using the stereo matching technology. The electronic device 100 may generate the depth spherical image using the extracted depth information.

In operation S1250, the electronic device 100 may generate the 360-degree 3D stereoscopic image by rendering the depth spherical image to the left- and right-eyed spherical images.

Figure 13:
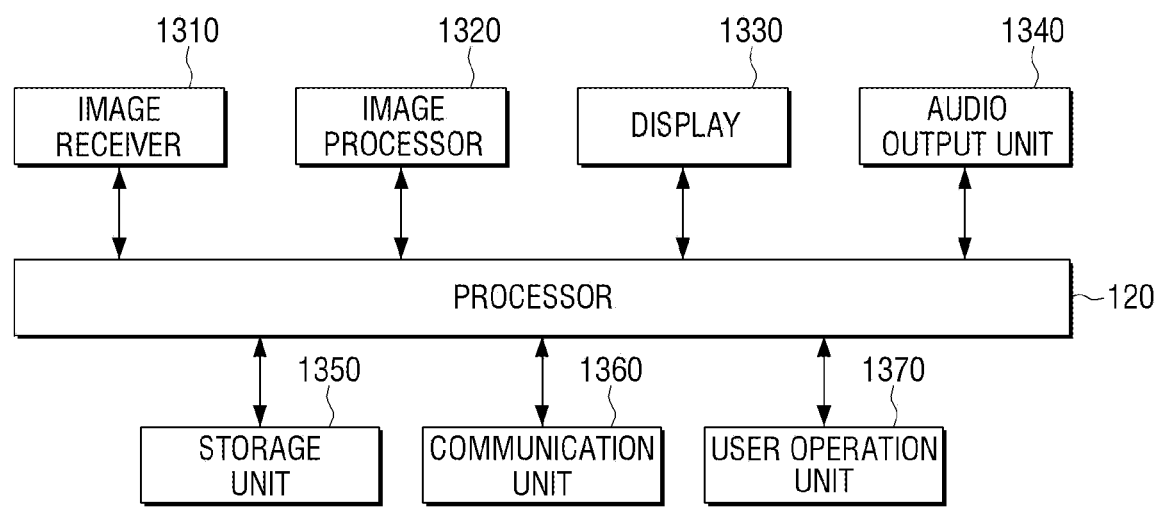
FIG. 13 is a detailed block diagram illustrating a configuration of an electronic device according to an embodiment of the present disclosure.

FIG. 13 is a detailed block diagram illustrating a configuration of an electronic device according to an embodiment of the present disclosure. As illustrated in FIG. 13, the electronic device 100 may include an image receiver 1310, an image processor 1320, a display 1330, an audio output unit 1340, a storage unit 1350, a communication unit 1360, a user operation unit 1370, and the processor 120.

The example that the electronic device 100 is a device having a function to display VR content and AR content is exemplified in FIG. 13 and various elements are integrally illustrated in FIG. 13. Accordingly, according to embodiments, a portion of the elements illustrated in FIG. 13 may be omitted or modified and other elements may be further added.

The image receiver 1310 receives image content from various external sources. Specifically, the image receiver 1310 may receive the VR content and the AR content in which a 360-degree image is imaged through a plurality of fisheye cameras from an external apparatus (for example, server, digital versatile disc (DVD), external camera). The image receiver 1310 may receive various image content through an external broadcasting station or Internet streaming.

The image processor 1320 may perform processing on image data received from the image receiver 1310. The image processor 220 may perform various image processing such as decoding, scaling, noise filtering, frame rate conversion, resolution conversion, and the like on the image data.

According to an embodiment of the present disclosure, the image processor 1320 may be implemented to perform image processing executed in the processor 120 of FIG. 1.

The display 1330 may display at least one of a video frame in which the image data received in the image receiver 1310 is processed in the image processor 1320 and various screens generated in a graphic processor 1383.

For example, the display 1330 may be a display device which may display the VR content and the AR content such as a television (TV), a liquid crystal display (LCD), a HMD, a mobile phone, a tablet personal computer (PC), a laptop computer, and the like. The display 1330 may be coupled to the electronic device 100 and may be an external apparatus which is coupled and communicates through a wired/wireless network or an interface such as HDMI.

The audio output unit 1340 may be configured to output audio data processed in an audio processor (not shown) as well as various alert sounds or voice messages. Specifically, the audio output unit 1340 may output various types of guide messages (for example, update guide message) in an audio form.

The storage unit 1350 stores various modules which drive the electronic device 100. For example, the storage unit 1350 may store software including a base module, a sensing module, a communication module, a presentation module, a web browser module, and a service module. The base module is a basic module which processes signals transferred from pieces of hardware included in the electronic device 100 and transfers the processed signals to an upper layer module. The sensing module is a module which collects information from various sensors and analyzes and manages the collected information. The sensing module may include a face recognition module, a voice recognition module, a motion recognition module, a near field communication (NFC) recognition module, and the like. The presentation module is a module configured to constitute a display screen and may include a multimedia module configured to reproduce and output multimedia content and a user interface (UI) rendering module which performs UI and graphic processing. The communication module is a module configured to perform communication with the outside. The web browser module is a module configured to access a web server by performing web browsing. The service module is a module including various applications for providing various services.

The storage unit 1350 may be implemented with a non-volatile memory, volatile memory, a flash memory, a hard disc drive (HDD), a solid-state drive (SSD), and the like. The storage unit 1350 may be accessed by the processor 1380 and read/record/correct/delete/update and the like of data may be performed through the processor 1380. The term "memory" in the present disclosure may include the storage unit 1350, a read only memory (ROM) 1382 and a random access memory (RAM) 1381 in the processor 1380 or a memory card (not shown) (for example, micro secure digital (SD) card, memory stick) mounted on the electronic device 100.

The storage unit 1350 may store a program, data, and the like for processing an image to be displayed in a display region of the display 1330.

According to an embodiment of the present disclosure, the storage unit 1350 may store the plurality of extracted sub images. The storage unit 1350 may store the depth information acquired from the sub images. The storage unit 1350 may store the depth spherical image generated using the acquired depth information. The storage unit 1350 may store the left and right color spherical/panoramic images generated from the sub images. The storage unit 1350 may store an operation algorithm, an error range, the number of divided regions, and the like which set the designated FOV for extracting the distortion-free sub images.

As described above, the storage unit 1350 may include various program modules, but a portion of the various program modules may be omitted or modified according to the type and characteristic of the electronic device 100 and another program module may be added.

The communication unit 1360 may be configured to perform communication with various types of external apparatuses according to various types of communication methods. The communication unit 1360 may include various communication chips such as a WIFI chip, a Bluetooth chip, a NFC chip, a wireless communication chip, and an infrared (IR) chip. For example, the WIFI chip, the Bluetooth chip, the NFC chip, and the IR chip may perform communication in a WIFI manner, a Bluetooth manner, an NFC manner, and an IR manner, respectively. Among the communication chips, the NFC chip may be a chip configured to operate in an NFC manner using a band of 13.56 MHz among various radio frequency identification (RF-ID) frequency bands such as 135 kHz, 13.56 MHz, 433 MHz, 860 to 960 MHz, and 2.45 GHz. In response to the WIFI chip or the Bluetooth chip being used, the communication unit 1360 may first transmit/receive a variety of connection information such as a service set identifier (SSID) and a session key, perform communication connection using the connection information, and transmit/receive a variety of information. The wireless communication chip may be a chip configured to perform communication according to various communication standards, such as Institute of Electrical and Electronics Engineers (IEEE), Zigbee, 3rd generation (3G), 3rd Generation Partnership Project (3GPP), or Long Term Evolution (LTE).

Specifically, the communication unit 1360 may acquire image content (for example, VR content and AR content) from an external server and an external apparatus. The communication unit 1360 may transmit information for a frequency component of an audio source to the external server and receive type information of an audio source corresponding to a frequency component from the external server.

The user operation unit 1370 receives various user command for controlling the electronic device 100. The user operation unit 1370 may be implemented with a remote controller including four-directional keys, but this is merely exemplary and the user operation unit may be implemented with various input device such as a pointing device including a motion sensor, a keyboard, a mouse, a motion input unit having a camera, a voice input unit having a microphone, a touch sensor, and the like.

The processor 120 may control an overall operation of the electronic device 100 using various types of program stored in the storage unit 1350. The processor 120 has been described in FIGS. 1 to 12 and thus detailed description therefor will be omitted herein.

The methods described in the present disclosure may be recorded in computer-recording media and then executed by the computer and thus the above-described functions may be executed.

The device (for example, electronic device 100) or the method (for example, operations) according to various embodiments of the present disclosure may be performed through at least one computer (for example, processor 120) which executes instructions included in at least one program among programs maintained, for example, in computer-readable storage media.

In response to the instructions being executed through the computer (for example, processor 120), the at least one computer may perform functions corresponding to the instructions. The computer-readable storage media may be, for example, a memory.

The program may be included, for example, in a computer-readable storage medium such as a hard disc, a floppy disc, a magnetic media (for example, magnetic tape), an optical media (for example, compact disc read only memory (CD-ROM)), a digital versatile disc (DVD), a magneto-optical media (for example, floptical disc), a hardware device (for example, a read only memory (ROM), random access memory (RAM), or flash memory), and the like. The storage media may be generally included as a portion of the configuration of the electronic device 100, may be mounted through ports of the electronic device 100, or may be included in an external apparatus (for example, cloud, server, or other electronic devices) located in the outside of the electronic device 100. The program may be separately stored in a plurality of storage media and at least portion of the plurality of storage media may be located in the external apparatus of the electronic device 100.

The instructions may include a machine language code such as a code generated by a compiler as well as a high-level language code executable by a computer using an interpreter and the like. The above-described hardware device may be configured to operate as one or more software modules to perform the operations of various embodiments, and vice versa.

The foregoing exemplary embodiments and advantages are merely exemplary and are not to be construed as limiting the present inventive concept. The description of the exemplary embodiments is intended to be illustrative, and not to limit the scope of the claims, and many alternatives, modifications, and variations will be apparent to those skilled in the art.

The invention claimed is:

1. An electronic device comprising:
   an imaging unit configured to acquire a plurality of images using a plurality of cameras; and
   a processor configured to:
      divide the plurality of images into a plurality of left-eyed images and a plurality of right-eyed images,
      generate a left-eyed spherical image by projecting the plurality of left-eyed images to a left unit sphere surface,
      generate a right-eyed spherical image by projecting the plurality of right-eyed images to a right unit sphere surface,
      obtain depth information using the left-eyed spherical image and the right-eyed spherical image, and
      generate a 360-degree 3D stereoscopic image by applying the depth information to at least one of the left-eyed spherical image or the right-eyed spherical image.

2. The electronic device according to claim 1, wherein the processor is further configured to:
   obtain, from the left-eyed spherical image, at least one first sphere surface image corresponding to a designated field of view from an origin of the left-eyed spherical image,
   obtain, from the right-eyed spherical image, at least one second sphere surface image corresponding to the designated field of view from an origin of the right-eyed spherical image, and
   extract, in overlapping the at least one first sphere surface image and the at least one second sphere surface image, a first sub image by projecting the at least one overlapped first sphere surface image to a plane corresponding to the designated field of view and a second sub image by projecting the at least one overlapped second sphere surface image to the plane corresponding to the designated field of view.

3. The electronic device according to claim 2, wherein the processor is further configured to:
   split a unit sphere surface entire region of the left-eyed spherical image into N left-eyed surface regions with designated field of views from the origin of the left-eyed spherical image, respectively, and extract a plurality of left-eyed sub images corresponding to the N left-eyed surface regions, the at least one first sphere surface image being one of the N left-eyed surface regions corresponding to one of the designated field of views, and
   split a unit sphere surface entire region of the right-eyed spherical image into N right-eyed surface regions with the designated field of views from the origin of the right-eyed spherical image, respectively, and extract a plurality of right-eyed sub images corresponding to the N right-eyed surface regions, the at least one second sphere surface image being one of the N right-eyed surface regions corresponding to one of the designated field of views.

4. The electronic device according to claim 2, wherein the processor is further configured to extract the first sub image and the second sub image from a first region in which a first left-eyed image corresponding to one of the plurality of images acquired through a first camera among the plurality of cameras and a second right-eyed image corresponding to one of the plurality of images acquired through a second camera among the plurality of cameras overlap the designated field of view.

5. The electronic device according to claim 2, wherein the processor is further configured to obtain the depth information from the first sub image and the second sub image using a stereo matching technology.

6. The electronic device according to claim 5, wherein the processor is further configured to generate a 360-degree depth spherical image including the obtained depth information.

7. The electronic device according to claim 6, wherein the processor is further configured to generate the 360-degree 3D stereoscopic image by rendering the 360-degree depth spherical image to at least one of the left-eyed spherical image or the right-eyed spherical image.

8. The electronic device according to claim 3, wherein the processor is further configured to set the designated field of views so that an error in sizes of the N left-eyed surface regions and the N right-eyed surface regions and an error in lengths of arcs on spherical spaces of the left-eyed surface regions and the N right-eyed surface regions are within designated ranges.

9. The electronic device according to claim 1, wherein each of the plurality of cameras comprises a fisheye camera.

10. An image processing method of an electronic device, the image processing method comprising:
    imaging a plurality of images using a plurality of cameras;
    dividing the plurality of images into left-eyed images and right-eyed images;
    generating a left-eyed spherical image by projecting the left-eyed images to a left unit sphere surface;
    generating a right-eyed spherical image by projecting the right-eyed images to a right unit sphere surface;
    obtaining depth information using the left-eyed spherical image and the right-eyed spherical image; and
    generating a 360-degree 3D stereoscopic image by applying the depth information to at least one of the left-eyed spherical image or the right-eyed spherical image.

11. The image processing method according to claim 10, wherein the acquiring the depth information further comprises:
    obtaining, from the left-eyed spherical image, at least one first sphere surface image corresponding to a designated field of view from an origin of the left-eyed spherical image;
    obtaining, from the right-eyed spherical image, at least one second sphere surface image corresponding to the designated field of view from an origin of the right-eyed spherical image; and
    extracting, in overlapping the at least one first sphere surface image and the at least one second sphere surface image, a first sub image by projecting the at least one first sphere surface image to a plane corresponding to the designated field of view and a second sub image by projecting the at least one second sphere surface image to the plane corresponding to the designated field of view.

12. The image processing method according to claim 11, wherein the extracting comprises:
    dividing a unit sphere surface entire region of the left-eyed spherical image into N left-eyed surface regions with designated field of views from the origin of the left-eyed spherical image, respectively, and extracting a plurality of left-eyed sub images corresponding to the N left-eyed surface regions, the at least one first sphere surface image being one of the N left-eyed surface regions corresponding to one of the designated field of views; and dividing a unit sphere surface entire region of the right-eyed spherical image into N right-eyed surface regions with the designated field of views from the origin of the right-eyed spherical image, respectively, and extracting a plurality of right-eyed sub images corresponding to the N right-eyed surface regions, the at least one second sphere surface image being one of the N right-eyed surface regions corresponding to one of the designated field of views.

13. The image processing method according to claim 11, wherein the extracting further comprises:

extracting the first sub image and the second sub image from a first region in which a first left-eyed image corresponding to one of the plurality of images acquired through a first camera among the plurality of cameras and a second right-eyed image corresponding to one of the plurality of images acquired through a second camera among the plurality of cameras overlaps the designated field of view.

14. The image processing method according to claim 11, wherein the obtaining the depth information comprises:

obtaining the depth information from the first sub image and the second sub image using a stereo matching technology.

15. The image processing method according claim 14, wherein the generating the 360-degree 3D stereoscopic image further comprises:

generating a 360-degree depth spherical image including the obtained depth information.

16. The image processing method according to claim 15, wherein the generating the 360-degree 3D stereoscopic image further comprises:

rendering the 360-degree depth spherical image to at least one of the left-eyed spherical image or the right-eyed spherical image.

* * * * *